March 17, 1936.  J. P. TRIPP  2,034,451
WORK SUPPORTING AND ROTATING APPARATUS
Filed March 2, 1934  3 Sheets-Sheet 1
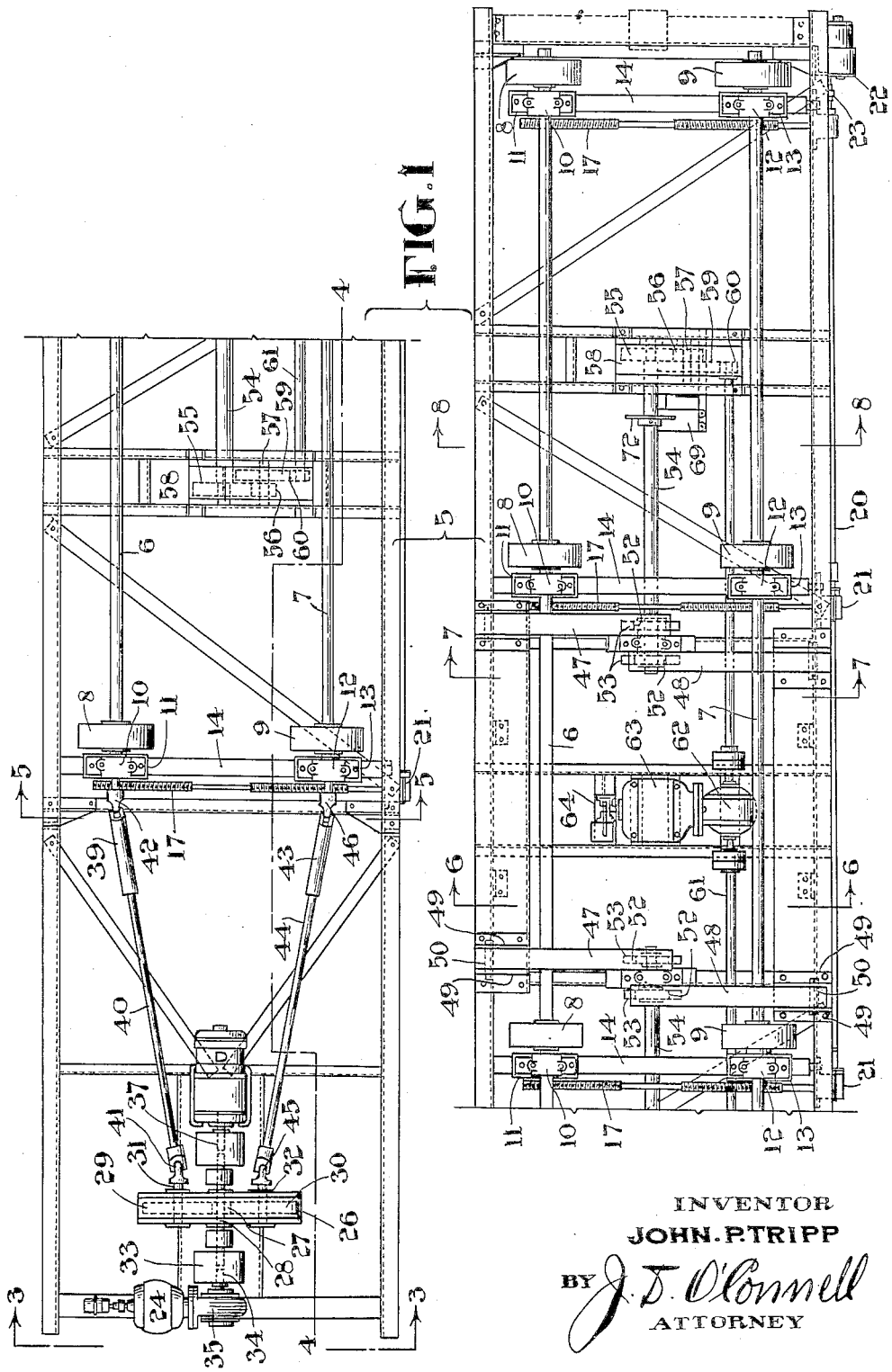
INVENTOR
JOHN. P. TRIPP
BY J. T. O'Connell
ATTORNEY

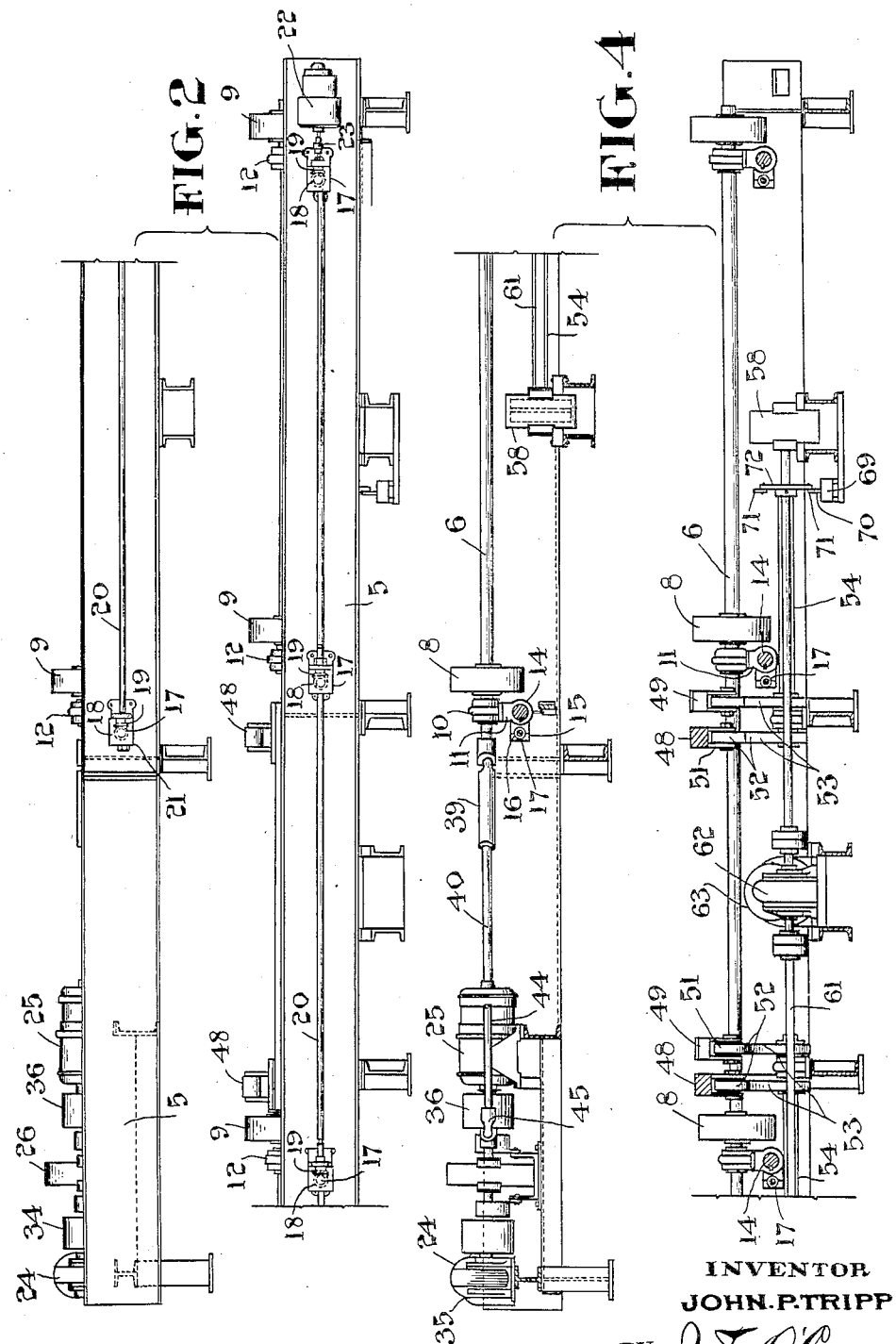

March 17, 1936.　　　J. P. TRIPP　　　2,034,451

WORK SUPPORTING AND ROTATING APPARATUS

Filed March 2, 1934　　　3 Sheets-Sheet 3

INVENTOR
JOHN. P. TRIPP
BY J. D. O'Connell
ATTORNEY

Patented Mar. 17, 1936

2,034,451

UNITED STATES PATENT OFFICE 2,034,451

WORK SUPPORTING AND ROTATING APPARATUS

John Percival Tripp, Montreal, Quebec, Canada

Application March 2, 1934, Serial No. 713,698

10 Claims. (Cl. 219—17)

This invention relates to electric arc welding apparatus and particularly to work supporting and rotating apparatus for use in connection with the circumferential seam welding of cylindrical objects such as pipes, tanks and the like.

One object of this invention is the provision of a simple and practical work supporting and rotating apparatus embodying rotary power-driven work supports capable of being quickly and conveniently adjusted to accommodate cylindrical objects of widely varying diameter.

Another object is the provision of separate motors adapted to be used alternately for driving the rotary work supports dependent upon the speed at which it is desired to rotate the work to meet different conditions of operation, one motor being a variable speed motor operable to rotate the work at any desired speed within the permissible range of welding speeds and the other being a constant speed motor operable to rotate the work at a higher speed when it is desired to effect rapid movement of a particular part of the seam to a welding position directly below the electrode.

Another object is the provision of flexible and universally adjustable driving connections between the work supports and their source of power whereby adjustment of the work supports to suit cylindrical objects of different diameters may be conveniently accomplished without disrupting said drive connections.

A still further object is the provision of simple and practical power operated mechanism for effecting the aforesaid adjustment of the power driven work supports.

A still further object is the provision of a work handling mechanism that enables the work supporting and rotating apparatus to be conveniently installed so that the rotary work supports are slightly below the floor level, said mechanism being operable to receive the work at floor level and to deposit it on the work supports preparatory to the welding operation and being also operable to elevate the work to a floor level discharging position when the welding operation is completed or whenever it is desired to move the work from said supports.

A still further object is the provision of simple and practical power driven means for actuating and controlling said work handling mechanism.

Other objects, advantages and characteristic features of this invention will be apparent from the following description of the accompanying drawings, in which—

Fig. 1 is a top plan view of work supporting and rotating apparatus constructed in accordance with this invention.

Fig. 2 is a side view of the apparatus appearing in Fig. 1.

Fig. 4 is a longitudinal sectional view taken substantially along the line 4—4 of Fig. 1.

Figure 7:
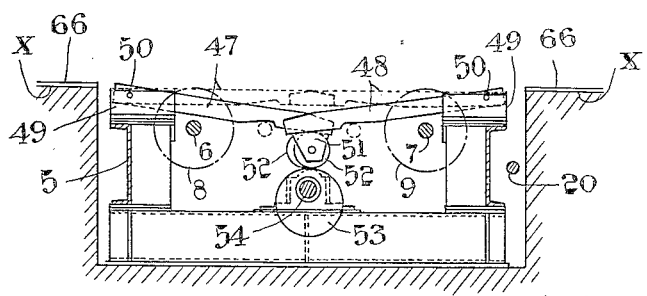
Figure 8:
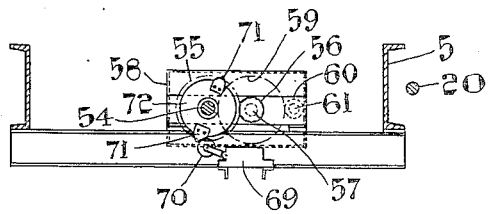
Figure 5:
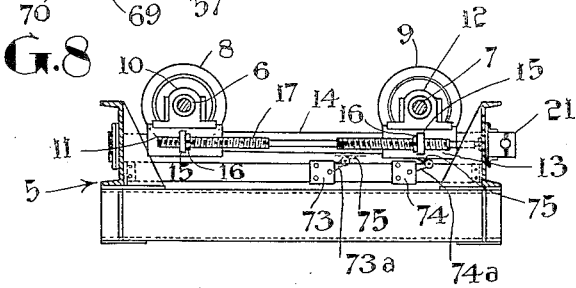
Figure 6:
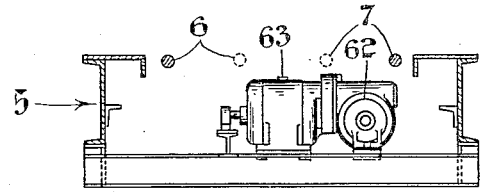
Figure 3:
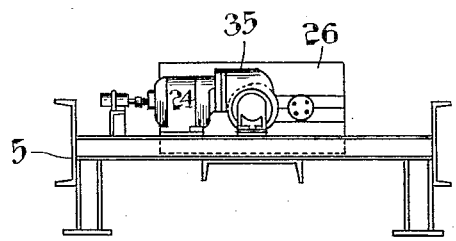
Fig. 3 is an end view of the apparatus as it appears when looking in the direction indicated by the line 3—3 of Fig. 1. In this view certain parts that would otherwise appear have been omitted for the sake of clearness.

Figs. 5, 6, 7 and 8 are transverse sectional views taken respectively along the lines 5—5, 6—6, 7—7 and 8—8 of Fig. 1. In all of these views certain parts are omitted to avoid confusion.

Referring more particularly to the drawings, 5 designates the fabricated frame structure of the work supporting and rotating apparatus provided in accordance with this invention. Adjustably mounted on this frame structure are two parallel shafts indicated at 6 and 7. A series of rotary work supporting rollers 8 are keyed to the shaft 6 and spaced along the length thereof to lie directly opposite similar work supporting rollers 9 keyed to the shaft 7. The shafts 6 and 7 are adjustably mounted so that the distance between the centers of the opposing rollers 8 and 9 may be varied to suit the diameter of the pipe, tank or other cylindrical work which is to be supported on the rollers. To this end shaft 6 is journalled in pillow blocks 10 mounted on pillow block slides 11 while shaft 7 is similarly journalled in pillow blocks 12 mounted on the pillow block slides 13. The pillow block slides 11 are directly opposed to the pillow block slides 13, the opposing slides of each pair being bored for the passage of a common guide shaft 14 extending between the side members of the frame 5. The opposing slides 11 and 13 of each pair are also provided with laterally projecting lugs 15 (see Figs. 1, 4 and 5) which are fitted with bushings 16 through which a screw shaft 17 is threaded so that, by turning this shaft the rollers 8 and 9, together with their carrying shafts 6 and 7, may be adjusted laterally to increase or decrease the distance between the centers of the two sets of rollers to suit the diameter of the cylindrical work which is to be supported and rotated by the rollers during the welding operation.

Each of the screw shafts 17 is provided with a miter gear 18 (see Fig. 2) meshing with a similar gear 19 on an operating shaft 20 which extends along one side of the frame 5 as shown in Fig. 2 and is journalled in casings 21 housing the intermeshing gears 18 and 19. The shaft 20 is driven by an electric motor 22 through the medium of a suitable coupling indicated at 23.

Two electric motors, appearing at 24 and 25 are adapted to be used alternately for driving the shafts 6 and 7. To this end there is provided a gear casing 26 containing a pinion 27 mounted on a shaft 28 and meshing with gears 29 and 30 mounted on the shafts 31 and 32. A magnetic clutch 33 is provided for clutching one end of the pinion shaft 28 to the shaft 34 of a speed reducer 35 driven by the motor 24. A similar magnetic clutch 36 is provided for clutching the opposite end of the pinion shaft 28 to the shaft 37 of the motor 25.

The shaft 31 of gear 29 is coupled to the work supporting shaft 6 by a flexible telescopic drive connection comprising a sleeve member 39 and a telescoping shaft member 40, the outer ends of which are respectively connected to the shafts 31 and 6 by the universal joint couplings appearing at 41 and 42. Between the shaft 32 of the gear 30 and the work supporting shaft 7 there is provided a similar coupling comprising a sleeve member 43 and a shaft member 44 having their outer ends respectively connected to the shafts 32 and 7 by the universal joint connections appearing at 45 and 46. This method of coupling the work supporting shafts 6 and 7 to their drive pinions permits the spacing of said shafts to be varied to suit the diameter of the work without disrupting the drive connection between the shafts and the motor operated driving pinion 27. The motor 24 is a variable speed motor that is used to drive the shafts 6 and 7 at any desired speed within the range of welding speeds for which the apparatus is designed. The motor 25 is a constant speed motor that is used to drive the shafts 6 and 7 at a higher speed when it is desired to quickly rotate a part of the work to a welding position directly beneath the welding electrode. The gearing 35 of the motor 24 is preferably of the self-locking type so that when this motor is at rest the clutch 33 may be engaged to lock the shafts 6 and 7 against rotation. This feature is useful when the pipe or other cylindrical object supported on the rolls 8 and 9 is sufficiently out of round to overhaul these rolls in the absence of some preventive means. Preferably, the two clutches 33 and 36 are electrically interlocked to prevent their simultaneous engagement. The electrical connections are also preferably arranged so that the clutch 36 is engaged after the constant speed motor 25 is started up and remains engaged until commencement of the welding operation when it is automatically released by operation of the motor 24. If desired, the motor 25 may be omitted and the clutch 33 of the motor 24 electrically connected so that it will be automatically released upon completion of each welding operation so that the work supported on the rollers 8 and 9 may then be rotated by hand. This arrangement is quite satisfactory when dealing with the welding of small light pieces but in the case of heavier work the provision of the work positioning motor 25 is an advantage. When both the motors 24 and 25 are employed it is desirable to provide means, in the electrical connections of the clutches 33 and 36, whereby both clutches may be disengaged to permit the work to be rotated by hand.

As clearly shown in Fig. 7 of the drawings the apparatus described in the foregoing is installed so that the work supporting and work rotating rollers 8 and 9 are slightly below the floor level indicated at X. The pipe or other cylindrical object to be welded is deposited on the rollers 8 and 9 and removed therefrom by a special form of work handling mechanism including two work handling bars 47 pivoted to one side of the frame 5 to co-operate with similar bars 48 pivoted to the opposite side of said frame. As here shown the inner ends of adjacent bars 47 and 48 are disposed in overlapping side-by-side relation while the outer ends are positioned between brackets 49 carrying pivots 50 on which the bars are mounted to swing in a vertical direction. The inner overlapping ends of the bars of each pair are provided with brackets 51 carrying rollers 52 which rest on eccentrics 53 fixed on the inner end of a shaft 54. The outer end of each shaft 54 (see Fig. 1) is provided with a gear 55 meshing with a pinion 56 fixed to a shaft 57 journalled in the gear casing 58. Each shaft 57 is also provided with a gear 59 meshing with a pinion 60 on a drive shaft 61 that is driven, through suitable reduction gearing 62, by a motor 63 equipped with a solenoid brake 64. The motor 63 is adapted to be operated so that, through the action of the eccentrics 53, the bars 47 and 48 may be positioned in either the dotted or full line position shown in Fig. 7. In their dotted or horizontal position the bars 47 and 48 are substantially parallel with track rails 66 along which the pipe or other cylindrical object may be conveniently shifted to a position where it rests on the overlapping portions of the two sets of bars. The motor 63 is then operated to rotate the eccentrics 53 to a position permitting lowering of the bars to the dotted line position shown in Fig. 7. During this movement thereof the bars serve to deposit the work on the rollers 8 and 9 and then continue downwardly until they are sufficiently below the upper tread portions of the rollers 8 and 9 to clear the work.

In order to stop the motor 63 subsequent to operation of the bars to either of the two positions mentioned above, I provide a limit switch 69 including a trip member 70 which is engaged and operated by one of the cam lifts 71 of a cam plate 72 that is fixed to rotate with one of the shafts 54. One cam lift 71 serves to trip the switch 69 to disrupt the flow of current to the motor 63 when the bars reach the horizontal position shown in Fig. 7, while the remaining cam lift serves to trip the switch and disrupt the flow of current to the motor when the bars are lowered to the full line position shown in Fig. 7. The purpose of the solenoid brake 64 is to prevent possible overhauling of the motor 63 in the event of current failure while the eccentrics 53 are in some position between their dead centers.

It is also desirable to provide additional limit switches for controlling the motor 22 to prevent over travel of the companion pillow block slides 11 and 13 during lateral adjustment of the shafts 6 and 7. For this purpose I have shown, in Fig. 5, limit switches 73 and 74 supported between the cross members of the frame 5 adjacent one of the pillow block slide supporting shafts 14, the slide 13 on the shaft being equipped with a projection 75 adapted to cooperate with the trip members 73a and 74a of the two limit switches. For example, when the slide 13 is moved inwardly to a predetermined point the projection 75 (as indicated by dotted lines) engages the trip member 73a and operates the limit switch 73 to disrupt the flow of current to the motor 22. Similarly, when the slide 13 is moved outwardly to a predetermined position the projection 75 engages the trip member 74a and operates the limit switch 74 to disrupt the flow of current to said motor.

Having thus described my invention, what I claim is:—

1. Work supporting and rotating apparatus comprising a pair of parallel, rotatably mounted work supporting shafts, means for adjusting said shafts laterally to vary the distance therebetween a driving pinion, a pair of gears meshing with said pinion, and a drive connection coupling each gear with the adjacent end of one of said work supporting shafts, each of said driving connections comprising a pair of telescopic members, one of which is connected by a universal joint to one of said gears and the other of which is similarly connected to one of said work supporting shafts.

2. Work supporting and rotating apparatus comprising a frame, two work supporting shafts extending longitudinally of said frame, a series of bearings rotatably supporting each shaft, the bearings of one shaft being laterally slidable on the frame and directly opposed to the bearings of the remaining shaft, bearing adjusting shafts extending transversely across the frame in screw threaded engagement with opposing bearings of the two series, a common operating shaft extending lengthwise of the frame in driving engagement with said screw shafts, a motor mounted on the frame and a drive connection between the motor shaft and said common operating shaft.

3. Work supporting and rotating apparatus comprising a rectangular frame including side members connected, at intervals, by spaced transversely extending bearing guides, two series of shaft bearings slidably supported by said guides for movement transversely of the frame, the bearings of one series being directly opposite the bearings of the remaining series and opposing bearings of the two series being slidably mounted on the same bearing guide, a pair of shafts extending longitudinally of said frame, each shaft being supported by the bearings of one of said series so as to lie parallel with the companion shaft, bearing adjusting shafts extending transversely across the frame in screw threaded engagement with opposing bearings of the two series, means for operating said bearing adjusting shafts in unison to effect lateral adjustment of the two series of bearings and the work supporting and rotating shafts carried thereby.

4. Work supporting and rotating apparatus as claimed in claim 3 in which each bearing includes a part bored to slidably receive one of the bearing guides therethrough.

5. Work supporting and rotating apparatus as claimed in claim 3 in which each bearing comprises a slide and a shaft supporting pillow block mounted thereon, said slide being bored for the passage of one of the bearing guides so that the latter serves to hold the slide on the pillow block against vertical displacement.

6. Work supporting and rotating apparatus comprising a rectangular frame, a pair of work supporting and rotating shafts extending longitudinally of said frame, a series of bearings rotatably supporting each of said shafts, the bearings of each series being mounted on the frame and slidable transversely thereof to permit of lateral adjustment of the shafts to vary the distance therebetween, means for rotating said work supporting and rotating shafts comprising a pair of rotatably mounted shafts located at one end of the frame and a telescopic drive connection connecting one end of each last mentioned shaft to the adjacent end of one of the work supporting and rotating shafts, said telescopic drive connections including universal joints at each end thereof.

7. Work supporting and rotating apparatus comprising a rectangular frame, a pair of parallel work supporting shafts extending longitudinally of said frame, a series of bearings rotatably supporting each of said shafts, said bearings being slidable on the frame to vary the distance therebetween, a power shaft rotatably mounted at one end of the frame and extending longitudinally thereof, a pair of counter shafts rotatably mounted at opposite sides of the power shaft and lying parallel therewith, a drive connection between the power shaft and each of said counter shafts and a telescopic drive connection coupling an end of each counter shaft to the adjacent end of one of the work supporting shafts.

8. Work supporting and rotating apparatus comprising a frame, parallel work supporting shafts rotatably mounted thereon, a series of arms having their outer ends pivoted to one side of said frame above said shaft, a second series of arms having their outer ends similarly pivoted to the opposite side of the frame, the arms of each series extending inwardly over the adjacent shaft towards the longitudinal center of the frame and means for simultaneously raising or lowering the inner ends of said arms.

9. Work supporting and rotating apparatus as claimed in claim 8 in which the last mentioned means comprises a plurality of rotary eccentrics, each supporting the inner end of one of said arms and means for simultaneously rotating all of said eccentrics.

10. Work supporting and rotating apparatus comprising a frame, parallel work supporting shafts rotatably mounted therein, a series of arms extending transversely above one of said shafts and having their outer ends pivoted to one side of said frame, a second series of arms extending transversely above the remaining shaft and having their outer ends pivoted to the opposite side of the frame, and arm supporting means mounted in the frame between said shafts for simultaneously raising or lowering the inner ends of said arms.

JOHN PERCIVAL TRIPP.